(12) United States Patent
Bernard et al.

(10) Patent No.: US 8,062,790 B2
(45) Date of Patent: Nov. 22, 2011

(54) PLASTICIZED ELECTRODE FOR AN ALKALINE BATTERY

(75) Inventors: Patrick Bernard, Bordeaux (FR); Lionel Goubault, Carignan de Bordeaux (FR); Nicolas Leroy, Saint Cyr l'Ecole (FR)

(73) Assignee: SAFT, Bagnolet (FR)

( * ) Notice: Subject to any disclaimer, the term of this patent is extended or adjusted under 35 U.S.C. 154(b) by 0 days.

(21) Appl. No.: 12/817,683

(22) Filed: Jun. 17, 2010

(65) Prior Publication Data

US 2010/0261052 A1   Oct. 14, 2010

Related U.S. Application Data

(62) Division of application No. 11/688,426, filed on Mar. 20, 2007, now abandoned.

(30) Foreign Application Priority Data

Mar. 21, 2006 (FR) ...................................... 06 02446

(51) Int. Cl.
*H01M 4/62* (2006.01)

(52) U.S. Cl. ........................................ 429/217; 429/232

(58) Field of Classification Search ............... 429/212, 429/217, 232

See application file for complete search history.

(56) References Cited

U.S. PATENT DOCUMENTS

| 5,595,841 | A | | 1/1997 | Suzuki |
| 5,824,434 | A | * | 10/1998 | Kawakami et al. ........... 429/209 |
| 2002/0122950 | A1 | | 9/2002 | Ehrlich et al. |
| 2002/0160256 | A1 | * | 10/2002 | Kami et al. .................. 429/122 |
| 2003/0017394 | A1 | | 1/2003 | Nakai et al. |
| 2004/0058240 | A1 | | 3/2004 | Christensen |
| 2006/0099505 | A1 | | 5/2006 | Fujino et al. |

FOREIGN PATENT DOCUMENTS

| EP | 0 584 987 A1 | 3/1994 |
| EP | 0 652 602 A2 | 5/1995 |
| EP | 0 809 314 A2 | 11/1997 |
| EP | 0865090 A1 | 9/1998 |
| EP | 0930663 A1 | 7/1999 |
| JP | 53074247 | 7/1978 |
| JP | 03-165469 A | 7/1991 |
| JP | 11135112 | 5/1999 |
| JP | 2003031223 | 1/2003 |

OTHER PUBLICATIONS

A Nickel Electrode With Ni-Coated 3D Steel Sheet for Hybrid Electric Vehicle Applications; Hiroshi Fukunaga, et al.; Journal of the Electrochemical Society, 152 (5) A905-A912 (2005).

* cited by examiner

*Primary Examiner* — Stephen J. Kalafut

(74) *Attorney, Agent, or Firm* — Sughrue Mion, PLLC

(57) ABSTRACT

An electrode including a conductive metal support and a paste including an electrochemically-active material and a binder. The binder includes a compound of silane type, and a polymer having at least one acrylic monomer, and representing at least approximately 0.15% of the weight of said paste. The use of this binder improves the calendar or cycle life of the battery at a temperature greater than or equal to 25° C., preferably at a temperature greater than or equal to 40° C.

38 Claims, No Drawings

PLASTICIZED ELECTRODE FOR AN ALKALINE BATTERY

CROSS-REFERENCE TO RELATED APPLICATIONS

This Application is a Divisional Application of U.S. application Ser. No. 11/688,426 filed Mar. 30, 2007, now abandoned; the entire disclosure of the prior application is hereby incorporated by reference.

SUMMARY OF THE INVENTION

1. Field of the Invention

The present invention relates to a plasticized electrode for an alkaline electrolyte battery, such as for example a nickel-cadmium or nickel metal hydride battery. It also includes the battery containing such an electrode.

2. Background

Several types of electrodes exist which are capable of being used in an alkaline electrolyte battery, such as sintered electrodes and non-sintered electrodes. Compared to the other types of electrodes, a non-sintered electrode contains a larger quantity of material, its volume capacity is therefore increased and its production costs are reduced.

A non-sintered electrode is composed of a support serving as a current collector, which is coated with a paste containing the active material and a binder, to which a conductive material is generally added. Once the paste is deposited on or in the support, the whole is compressed and dried in order to obtain an electrode of the desired density and thickness.

Among the non-sintered electrodes, the nickel foam type electrode which has a three-dimensional support, and the plasticized electrode which has a support in the form of a foil of perforated metal or of expanded metal, are distinguished.

An analysis of the costs per component of a conventional NiMH battery shows that the substrate of the positive electrode, of the nickel foam type, therefore three-dimensional, represents more than 50% of the cost of the current electrode. Extending NiMH technology to applications such as the hybrid electric vehicle requires significant cost reductions for the batteries.

This is why, the use of a two-dimensional support is sometimes preferred to that of a three-dimensional conductor.

However, the mechanical performance of the active material and its adhesion to the two-dimensional support are generally insufficient.

In order to improve the mechanical performance and the adhesion of the active material to the three-dimensional support, document EP-A-0 865 090 proposes an electrode comprising as binder a fluoroplastic such as polytetrafluoroethylene (PTFE) and a coupling agent of silane type.

Positive electrodes with plasticized technology comprising a binder based on styrene acrylate have been developed. The article published in Journal of The Electrochemical Society (152 (5) A905-A912 (2005)) discloses a positive electrode of a nickel metal hydride battery comprising a three-dimensional nickel plated steel strip and a binder of the styrene acrylate type. However the life of this battery is 1000 cycles at 25° C. and only 180 cycles at 45° C. due to decomposition of the styrene acrylate.

An alkaline battery is therefore sought having an improved cycle life and/or calendar life (the calendar life corresponds to the situation of a battery in storage, not in use), for a temperature greater than or equal to 25° C., preferably greater than or equal to 40° C.

SUMMARY OF THE INVENTION

The invention relates to an electrode comprising a conductive metallic support and a paste comprising an electrochemically-active material and a binder; this binder comprising:

a) a compound of silane type b) a polymer comprising at least one acrylic monomer, and representing at least approximately 0.15% of the weight of said paste.

The use of silane improves the cycle life of the battery and/or the calendar life for a temperature greater than or equal to 25° C., preferably greater than or equal to 40° C.

The invention includes an alkaline electrolyte battery comprising such an electrode.

DETAILED DESCRIPTION OF EMBODIMENTS OF THE INVENTION

The article published in Journal of The Electrochemical Society (152 (5) A905-A912 (2005)) explains that an electrode binder constituted by styrene acrylate degrades rapidly when it is used in the electrodes of a battery operating in cycles at a temperature greater than 20° C. This results in a reduction in the cycle life of this battery. The invention solves this problem by substituting part of the styrene acrylate with a compound of silane type. In order that the electrode retains good flexibility, the substitution of the polymer by the compound of silane type must nevertheless be limited. According to the invention, the mass percentage of the polymer comprising an acrylic monomer must be at least approximately 0.15%, preferably at least approximately 0.30% and yet more preferably at least approximately 0.45% of the weight of the paste.

The compound of silane type used in the invention, is represented by the formula: $X_p$—$Si(R)_{4-p}$ in which:

X is chosen from the group comprising an alkyl, substituted or not by a halogen, an alkenyl, an aryl, an alkylaryl, an arylalkyl, an alkenylaryl, an arylalkenyl, an epoxy, an amine, a styrylamine, a methacrylate.

R is chosen from the group comprising H, a halogen, a hydroxy, alkoxy, acyloxy group, a cyclic alkyl, an aryl or —$NR_2$ in which R is H or an alkyl.

p is 1, 2 or 3.

According to a preferred embodiment, the compound of silane type is glycidyloxypropyltrimethoxy-silane.

The polymer comprising at least one acrylic monomer can be chosen from styrene acrylate, poly(meth)acrylate, hydrolyzed styrene-maleic anhydride.

The mass proportions of the polymer and the compound of silane type vary between 95%/5% and 50%/50%. This thus makes it possible to ensure suitable mechanical properties for the electrode (elasticity, intergranular cohesion and adherence to the current collector), whilst improving the chemical resistance of the binder.

Preferably, the mass proportion of the binder added is comprised between 0.16 and 3% of the weight of the paste.

The invention applies to the positive electrodes as well as to the negative electrodes of an alkaline battery.

The paste deposited on the current collector generally comprises the electrochemically-active material, one or more thickening agents, the binder and generally one or more electronic conductive elements.

The electrochemically-active material of the positive electrode can be a nickel hydroxide containing at least one element chosen from Zn, Cd or Mg and at least one element chosen from Co, Mn, Al, Y, Ca, Sr, Zr, Cu. Preferably, this hydroxide has a spheroidal shape and has a granulometry comprised between 7 and 20 µm. The nickel hydroxide can preferably be covered with a coating based on cobalt hydroxide optionally partially oxidized, or combined with a conductive compound, principally constituted by $Co(OH)_2$. Other compounds such as Co, CoO, $LiCoO_2$, metal powders, carbons, ZnO, $Y_2O_3$, $Yb_2O_3$, $Nb_2O_3$ can be added to the active material.

The electrochemically-active material of the negative electrode can be:
- a hydrogen-fixing alloy being able to be of the $AB_5$, $A_2B_7$, or $A_5B_{19}$ type,
- a cadmium-based compound such as CdO or $Cd(OH)_2$.

The electrode can also comprise a cellulose polymer such as carboxymethyl cellulose (CMC), hydroxypropylmethyl cellulose (HPMC), hydroxypropyl cellulose (HPC), or hydroxymethyl cellulose (HEC), or a polymer of the polyacrylic acid (PAAC) type.

According to one embodiment, conductive or non-conductive fibres can be added to the electrode. Preferably, the quantity of fibres added is less than 1.5% of the weight of the paste. Preferably, these are for example polypropylene polymer fibres, with a diameter comprised between 10 and 35 µm and with a length of less than 2 mm.

The electrode support is a metal conductor. It can be a two-dimensional support, for example made of nickel of the expanded type or a nickel plated steel strip, with a thickness comprised between 20 µm and 100 µm or a nickel plated steel strip shaped three-dimensionally, with a total thickness comprised between 100 and 700 µm.

The invention is also an alkaline battery of the Nickel Cadmium or Nickel Metal Hydride type for example, using at least one plasticized electrode described above (positive, negative or both) and containing an electrolyte based on KOH and/or NaOH and/or LiOH and a separator based on polyolefin fibres which are untreated or treated with acrylic acid or sulphonated or based on polyamide fibres.

The battery can be of the cylindrical or prismatic type, open or sealed (valve regulated), for portable or industrial applications (vehicle and emergency lighting in particular).

The invention also relates to the use of a composition comprising:
a) a compound of silane type, and
b) a polymer comprising at least one acrylic monomer
in the production of a battery electrode in order to improve the calendar life and/or the cycle life of this battery, at a temperature greater than or equal to 25° C., preferably greater than or equal to 40° C.

EXAMPLES

A first reference positive electrode (P1) is produced with a paste having as composition by weight:

| | |
|---|---|
| Electrochemically-active material | 88.2% |
| Conductive material $Co(OH)_2$ | 10% |
| PTFE binder | 1% |
| Cellulose polymer CMC | 0.3% |
| $Y_2O_3$ | 0.5% |

The electrochemically-active material in powder form is constituted by a hydroxide based on nickel, and containing the following substituents: cobalt and zinc. The viscosity of the paste is adjusted with water. The paste is introduced into a three-dimensional conductive support which is a nickel foam with a porosity of approximately 95%. Once the paste is introduced into the support, the whole is dried in order to remove the water from it, rolled then cut in order to obtain the electrode with the desired dimensions. The finished electrode has a porosity of 30% and a grammage of 16 g/dm².

A reference plasticized positive electrode (P2) is produced with a paste having as composition by weight:

| | |
|---|---|
| Electrochemically-active material | 85.2% |
| Conductive material $Co(OH)_2$ | 10% |
| PTFE binder | 3% |
| Cellulose polymer CMC | 0.3% |
| Polypropylene polymer fibre | 1.0% |
| $Y_2O_3$ | 0.5% |

The electrochemically-active material in powder form is constituted by a hydroxide based on nickel, and containing the following substituents: cobalt and zinc. The viscosity of the paste is adjusted with water. The paste is deposited simultaneously on the two faces of a two-dimensional metal support (perforated nickel plated steel with a thickness of 75 µm) in a homogeneous manner. The whole is then dried in order to remove the water from it, then rolled to the desired thickness and cut in order to obtain a positive electrode. The finished electrode has a porosity of 35% and a grammage of 16 g/dm².

A reference plasticized positive electrode (P3) is produced with a paste having as composition by weight:

| | |
|---|---|
| Electrochemically-active material | 87.2% |
| Conductive material $Co(OH)_2$ | 10% |
| Styrene-acrylate binder | 1% |
| Cellulose polymer CMC | 0.3% |
| Polypropylene polymer fibre | 1.0% |
| $Y_2O_3$ | 0.5% |

The electrochemically-active material in powder form is constituted by a hydroxide based on nickel, and containing the following substituents: cobalt and zinc. The viscosity of the paste is adjusted with water. The paste is deposited simultaneously on the two faces of a two-dimensional metal support (perforated nickel plated steel with a thickness of 75 µm) in a homogeneous manner. The mixture is then dried in order to remove the water from it, then rolled to the desired thickness and cut in order to obtain a positive electrode. The finished electrode has a porosity of 35% and a grammage of 16 g/dm².

A positive electrode of the invention (P4) is produced with a paste having as composition by weight:

| | |
|---|---|
| Electrochemically-active material | 87.2% |
| Conductive material $Co(OH)_2$ | 10% |
| Styrene-acrylate binder | 0.7% |
| Glycidoxypropyltrimethoxy-silane | 0.3% |
| Cellulose polymer CMC | 0.3% |
| Polypropylene polymer fibre | 1.0% |
| $Y_2O_3$ | 0.5% |

The electrochemically-active material in powder form is constituted by a hydroxide based on nickel, and containing the following substituents: cobalt and zinc. The viscosity of the paste is adjusted with water. The paste is deposited simultaneously on the two faces of a two-dimensional metal support (perforated nickel plated steel with a thickness of 75 µm) in a homogeneous manner. The whole is then dried in order to remove the water from it, then rolled to the desired thickness and cut in order to obtain a positive electrode. The finished electrode has a porosity of 35% and a grammage of 16 g/dm².

A reference plasticized positive electrode (P5) is produced with a paste having as composition by weight:

| Electrochemically-active material | 88.1% |
|---|---|
| Conductive material Co(OH)$_2$ | 10% |
| Styrene-acrylate binder | 0.10% |
| Glycidoxypropyltrimethoxy-silane | 0.03% |
| Cellulose polymer CMC | 0.3% |
| Polypropylene polymer fibre | 1.0% |
| Y$_2$O$_3$ | 0.5% |

The electrochemically-active material in powder form is constituted by a hydroxide based on nickel, and containing the following substituents: cobalt and zinc. The viscosity of the paste is adjusted with water. The paste is deposited simultaneously on the two faces of a two-dimensional metal support (perforated nickel plated steel with a thickness of 75 μm) in a homogeneous manner. The whole is then dried in order to remove the water from it, then rolled to the desired thickness and cut in order to obtain a positive electrode. The finished electrode has a porosity of 35% and a grammage of 16 g/dm².

A positive electrode of the invention (P6) is produced with a paste having as composition by weight:

| Electrochemically-active material | 87.2% |
|---|---|
| Conductive material Co(OH)$_2$ | 10% |
| Polyacrylate binder | 0.7% |
| Glycidoxypropyltrimethoxy-silane | 0.3% |
| Cellulose polymer CMC | 0.3% |
| Polypropylene polymer fibre | 1.0% |
| Y$_2$O$_3$ | 0.5% |

The electrochemically-active material in powder form is constituted by a hydroxide based on nickel, and containing the following substituents: cobalt and zinc. The viscosity of the paste is adjusted with water. The paste is deposited simultaneously on the two faces of a two-dimensional metal support (perforated nickel plated steel with a thickness of 75 μm) in a homogeneous manner. The whole is then dried in order to remove the water from it, then rolled to the desired thickness and cut in order to obtain a positive electrode. The finished electrode has a porosity of 35% and a grammage of 16 g/dm².

A reference negative electrode (N1) is produced with a paste having as composition by weight:

| Electrochemically-active material | 97.4% |
|---|---|
| Styrene-acrylate binder | 1.0% |
| Carbon | 0.5% |
| Cellulose polymer CMC | 0.3% |
| Polypropylene polymer fibre | 0.8% |

The electrochemically-active material in powder form is an intermetallic compound of the AB$_5$ type which is capable of forming a hydride, once charged. The viscosity of the paste is adjusted with water. The paste is deposited simultaneously on the two faces of a two-dimensional metal support (perforated nickel plated steel with a thickness of 50 μm) in a homogeneous manner. The whole is then dried in order to remove the water from it, then rolled to the desired thickness and cut in order to obtain a negative electrode. The finished electrode has a porosity of 25% and a grammage of 19 g/dm².

A negative electrode of the invention (N2) is produced with a paste having as composition by weight:

| Electrochemically-active material | 97.4% |
|---|---|
| Styrene-acrylate binder | 0.7% |
| Glycidoxypropyltrimethoxy-silane | 0.3% |
| Carbon | 0.5% |
| Cellulose polymer CMC | 0.3% |
| Polypropylene polymer fibre | 0.8% |

The electrochemically-active material in powder form is an intermetallic compound of the AB$_5$ type which is capable of forming a hydride, once charged. The viscosity of the paste is adjusted with water. The paste is deposited simultaneously on the two faces of a two-dimensional metal support (perforated nickel plated steel with a thickness of 50 μm) in a homogeneous manner. The whole is then dried in order to remove the water from it, then rolled to the desired thickness and cut in order to obtain a negative electrode. The finished electrode has a porosity of 25% and a grammage of 19 g/dm².

A test of mechanical performance of the electrodes thus produced is carried out in the following manner: Each electrode is weighed, then dropped from a height of 50 cm onto a flat surface. The drop is repeated 10 times. Then the electrode is weighed again. The result of the test is expressed as the ratio of the initial mass less the final mass with respect to the initial mass. An electrode is more solid the lower this ratio is and the mechanical performance of the electrode is considered to be satisfactory when this ratio is less than 0.5%.

The results of the mechanical test are shown in Table 1:

TABLE 1

| | Electrode | | | | | | | |
|---|---|---|---|---|---|---|---|---|
| | P1 | P2 | P3 | P4 | P5 | P6 | N1 | N2 |
| Support | Foam | strip | strip | strip | strip | strip | strip | strip |
| PTFE | 1% | 3% | — | — | — | — | — | — |
| Styrene acrylate | — | — | 1% | 0.7% | 0.10% | — | 1% | 0.7% |
| Polyacrylate | — | — | — | — | — | 0.7% | — | — |
| Silane | — | — | — | 0.3% | 0.03% | 0.3% | — | 0.3% |
| Test (%) | 0.21 | 13 | 0.32 | 0.38 | 15 | 0.43 | 0.23 | 0.29 |

The electrode P1 comprises a three-dimensional support, which is a nickel foam, and PTPE as binder. P1 has a satisfactory mechanical stability.

The electrode P2 comprises a two-dimensional support, which is a strip and 3% PTFE as binder. P2 has a mediocre mechanical stability which does not allow mounting in a cylindrical battery.

The electrode P3 comprises a two-dimensional support, which is a strip, and 1% styrene acrylate as binder.

In the electrode P4, compared with the electrode P3, a fraction of the styrene-acrylate binder has been replaced by silane the mass percentage of which represents 0.3% of the weight of the paste. The mass loss of active material measured during the test changes from 0.32% to 0.38% which corresponds to a degradation of the mechanical performance of approximately 20%. However, the degradation of the mechanical performance remains within the acceptable limits since the mass loss remains less than 0.5%.

The electrode P5 which is outside of the field of the invention has an overall binder content of 0.13% including 0.03% silane. In this case, the mechanical performance of the electrode is insufficient to carry out mounting in a cylindrical battery.

Comparing the results obtained with the negative electrodes N1 and N2, it is observed that the substitution of a part of the styrene acrylate with silane has the effect of increasing the loss of mass of active material; this changes from 0.23% to 0.29%, i.e. an increase of 26%. However, this degradation of the mechanical performance remains acceptable since the mass loss remains less than 0.5%.

The increase of the mass loss caused by the replacement of a part of the styrene acrylate with silane does not lead to a reduction in the life of a battery having at least one electrode according to the invention. On the contrary, the life of a battery having at least one electrode according to the invention, has an increased cycle life at 40° C. This is demonstrated by the following electric tests:

A sealed NiMH AA-size secondary electrochemical generator, the positive electrode of which is the electrode with limiting capacity, and the nominal capacity of which is 1200 mAh, is constituted by the positive and negative electrodes described above. A positive electrode is placed alongside a negative electrode from which it is isolated by a polypropylene non-woven separator in order to form the electrochemical bundle. The bundle thus spirally wound is inserted into a small metal container and impregnated with an alkaline electrolyte which is an aqueous alkaline solution constituted by a mixture of 7.5N potassium hydroxide KOH, 0.4N sodium hydroxide NaOH and 0.5N lithium hydroxide LiOH in order to constitute the batteries A, B, C, D and E. The composition of each of the batteries is described in Table 2.

TABLE 2

| | Reference | | | | |
|---|---|---|---|---|---|
| | A | B | C | D | E |
| Positive electrode | P1 | P3 | P4 | P6 | P4 |
| Negative electrode | N1 | N1 | N1 | N1 | N2 |

The binder composition according to the invention gives the electrodes good flexibility. It makes it possible to carry out a spiral winding of these electrodes in a battery with a cylindrical format.

Electrochemical Performance:

After a 48 hour rest period at ambient temperature, an electrical forming of the batteries is carried out under the following conditions:

Cycle 1:
Rest 2 hours at 85° C.
Charge at 0.025 Ic for 8 hours at 80° C., where Ic is the current necessary for discharging the nominal capacity C of the generator in 1 hour.
Rest 2 hours at 20° C.
Charge 3 hours at a current of 0.33 Ic
Discharge at 0.2 Ic to a voltage of 1 V
Cycles 2 to 10:
Charge 16 hours at a current of 0.1 Ic
Discharge at 0.2 Ic to a voltage of 1 V
Cycle 11:
Charge 72 minutes at an Ic current
Discharge at Ic to a voltage of 1 V After the initial 11 cycles, half of the batteries undergo the cycle test 1 and the other half the cycle test 2.

Cycle Test 1:
T=20° C.
Cycle Conditions:
Charge for 66 minutes at a current of C at 20° C.
Discharge at Ic at 20° C. to a voltage of 1 V Cycle Test 2:
T=40° C.
Cycle Conditions:
Charge for 66 minutes at a current of C at 40° C.
Discharge at Ic at 40° C. to a voltage of 1 V The life of the batteries is determined by the number of cycles carried out until the capacity of the battery becomes less than 80% of the nominal capacity. The results of the electric tests are shown in Table 3:

TABLE 3

| | Reference | | | | |
|---|---|---|---|---|---|
| | A | B | C | D | E |
| Positive electrode | P1 | P3 | P4 | P6 | P4 |
| Negative electrode | N1 | N1 | N1 | N1 | N2 |
| Efficiency of the positive electrode In cycle 10 (mAh/g) | 253 | 254 | 253 | 254 | 253 |
| Efficiency of the positive electrode In cycle 11 (mAh/g) | 244 | 243 | 243 | 242 | 245 |
| Life (cycles) in Test 1 at 20° C. | 730 | 715 | 725 | 718 | 740 |
| Life (cycles) in Test 2 at 40° C. | 512 | 146 | 488 | 492 | 685 |

Batteries C, D and E comprise a positive electrode according to the invention. The life of these batteries at the end of the test 2 is increased since it is 488, 492 and 685 cycles respectively, compared with 146 cycles obtained for battery B.

Battery E comprises a positive electrode and a negative electrode according to the invention. Its life at 40° C. is the longest: it is 685 cycles.

It is therefore understood that the substitution, in the positive or negative electrode, of a fraction of the polymer comprising the acrylic monomer with a silane, makes it possible to improve the battery life in a cycle test at 40° C. It does not reduce either the efficiency of the electrode or the cycle life of the battery at 20° C.

It can therefore be deduced from this that in the case of a binder comprising a polymer comprising an acrylic monomer, and a compound of silane type, the good mechanical performance of the electrode is not the only factor making it possible to obtain an increased battery life. In fact, it has been shown in Table 1 that the substitution of a fraction of the styrene-acrylate polymer with silane reduced the mechanical performance of the electrode (comparison of the electrode P4 with the electrode P3 and the electrode N2 with the electrode N1). Nevertheless, the tests of the life of a battery comprising an electrode in which a fraction of the polymer comprising an acrylic monomer was substituted with silane, have shown that the life of the battery was increased even for a cycle temperature of 40° C.

The invention claimed is:

1. Electrode comprising a conductive metal support and a paste comprising a compound based on nickel hydroxide and a binder; this binder comprising:
    a) a compound of silane type, and
    b) a polymer comprising at least one acrylic monomer, and representing at least 0.15% of the weight of said paste.

2. Electrode comprising a conductive metal support and a paste comprising a hydrogen fixing alloy and a binder; this binder comprising:
    a) a compound of silane type, and
    b) a polymer comprising at least one acrylic monomer, and representing at least 0.15% of the weight of said paste.

3. Electrode comprising a conductive metal support and a paste comprising a compound based on cadmium and a binder; this binder comprising:
   a) a compound of silane type, and
   b) a polymer comprising at least one acrylic monomer, and representing at least 0.15% of the weight of said paste.

4. Alkaline electrolyte battery comprising an electrode, including a conductive metal support and a paste comprising an electrochemically-active material and a binder; the binder comprising:
   a) a compound of silane type, and
   b) a polymer comprising at least one acrylic monomer, and representing at least 0.15% of the weight of said paste.

5. Process for the production of a battery electrode comprising the step of adding:
   a) a compound of silane type, and
   b) a polymer comprising at least one acrylic monomer to an electrochemically active material selected from the group consisting of nickel hydroxide, a hydrogen fixing alloy and a compound based on cadmium.

6. Electrode according to claim 1, in which the polymer represents at least 0.3% of the weight of said paste.

7. Electrode according to claim 6, in which the polymer represents at least 0.45% of the weight of said paste.

8. Electrode according to claim 1, in which the conductive support is two-dimensional.

9. Electrode according to claim 1, in which the compound of silane type has the formula: $X_p$—Si $(R)_{4-p}$, in which:
   X is chosen from the group comprising an alkyl, substituted or not by a halogen, an alkenyl, an aryl, an alkylaryl, an arylalkyl, an alkenylaryl, an arylalkenyl, an epoxy, an amine, a styrylamine, a methacrylate,
   R is chosen from the group comprising H, a halogen, a hydroxy, alkoxy, acyloxy group, a cyclic alkyl, an aryl or —$NR_2$ in which R is H or an alkyl,
   p is 1, 2 or 3.

10. Electrode according to claim 1, in which the compound of silane type is glycidyloxypropyltrimethoxy-silane.

11. Electrode according to claim 1, in which the polymer is chosen from styrene acrylate, poly(meth)acrylate, and hydrolyzed styrene-maleic anhydride.

12. Electrode according to claim 1, in which the mass proportions of the polymer and the compound of silane type vary between 95%/5% and 50%/50%.

13. Electrode according to claim 1, in which the mass proportion of the binder is comprised between 0.16 and 3% of the weight of the paste.

14. Electrode according to claim 1, also comprising fibres.

15. Electrode according to claim 14, in which the fibres are polypropylene fibres.

16. Electrode according to claim 14, in which the quantity of fibres added is less than 1.5% of the weight of the paste.

17. Electrode according to claim 2, in which the polymer represents at least 0.3% of the weight of said paste.

18. Electrode according to claim 17, in which the polymer represents at least 0.45% of the weight of said paste.

19. Electrode according to claim 2, in which the conductive support is two-dimensional.

20. Electrode according to claim 2, in which the compound of silane type has the formula: $X_p$—Si $(R)_{4-p}$, in which:
   X is chosen from the group comprising an alkyl, substituted or not by a halogen, an alkenyl, an aryl, an alkylaryl, an arylalkyl, an alkenylaryl, an arylalkenyl, an epoxy, an amine, a styrylamine, a methacrylate,
   R is chosen from the group comprising H, a halogen, a hydroxy, alkoxy, acyloxy group, a cyclic alkyl, an aryl or —$NR_2$ in which R is H or an alkyl,
   p is 1, 2 or 3.

21. Electrode according to claim 2, in which the compound of silane type is glycidyloxypropyltrimethoxy-silane.

22. Electrode according to claim 2, in which the polymer is chosen from styrene acrylate, poly(meth)acrylate, and hydrolyzed styrene-maleic anhydride.

23. Electrode according to claim 2, in which the mass proportions of the polymer and the compound of silane type vary between 95%/5% and 50%/50%.

24. Electrode according to claim 2, in which the mass proportion of the binder is comprised between 0.16 and 3% of the weight of the paste.

25. Electrode according to claim 2, also comprising fibres.

26. Electrode according to claim 25, in which the fibres are polypropylene fibres.

27. Electrode according to claim 25, in which the quantity of fibres added is less than 1.5% of the weight of the paste.

28. Electrode according to claim 3, in which the polymer represents at least 0.3% of the weight of said paste.

29. Electrode according to claim 3, in which the polymer represents at least 0.45% of the weight of said paste.

30. Electrode according to claim 3, in which the conductive support is two-dimensional.

31. Electrode according to claim 3, in which the compound of silane type has the formula: $X_p$—Si $(R)_{4-p}$, in which:
   X is chosen from the group comprising an alkyl, substituted or not by a halogen, an alkenyl, an aryl, an alkylaryl, an arylalkyl, an alkenylaryl, an arylalkenyl, an epoxy, an amine, a styrylamine, a methacrylate,
   R is chosen from the group comprising H, a halogen, a hydroxy, alkoxy, acyloxy group, a cyclic alkyl, an aryl or —$NR_2$ in which R is H or an alkyl,
   p is 1, 2 or 3.

32. Electrode according to claim 3, in which the compound of silane type is glycidyloxypropyltrimethoxy-silane.

33. Electrode according to claim 3, in which the polymer is chosen from styrene acrylate, poly(meth)acrylate, and hydrolyzed styrene-maleic anhydride.

34. Electrode according to claim 3, in which the mass proportions of the polymer and the compound of silane type vary between 95%/5% and 50%/50%.

35. Electrode according to claim 3, in which the mass proportion of the binder is comprised between 0.16 and 3% of the weight of the paste.

36. Electrode according to claim 3, also comprising fibres.

37. Electrode according to claim 36, in which the fibres are polypropylene fibres.

38. Electrode according to claim 36, in which the quantity of fibres added is less than 1.5% of the weight of the paste.

* * * * *